Aug. 22, 1944.   S. W. E. ANDERSSON   2,356,556
REGULATOR
Filed Aug. 15, 1941    2 Sheets-Sheet 1

INVENTOR
Sven W. E. Andersson
BY
ATTORNEY

Aug. 22, 1944.  S. W. E. ANDERSSON  2,356,556
REGULATOR
Filed Aug. 15, 1941  2 Sheets-Sheet 2

INVENTOR
Sven W. E. Andersson
BY
ATTORNEY

Patented Aug. 22, 1944

2,356,556

UNITED STATES PATENT OFFICE 2,356,556

REGULATOR

Sven W. E. Andersson, Evansville, Ind., assignor to Servel, Inc., New York, N. Y., a corporation of Delaware Application August 15, 1941, Serial No. 406,987

8 Claims. (Cl. 257—3)

This invention relates to regulators for regulating the heat output of a heat source.

It is an object of the invention to provide an improvement whereby a plurality of devices are heated by heat derived from a heat source, and to employ a regulator for varying the heat output of the heat source in accordance with the manner in which heat is supplied to the devices.

Another object of the invention is to provide an improved gas pressure regulator whereby the same regulator can be employed to supply gas at different predetermined delivery pressures.

A further object of the invention is to provide a regulator of the foregoing type with mechanism whereby the gas supply can be automatically changed from one to another predetermined delivery pressure.

Figure 1:
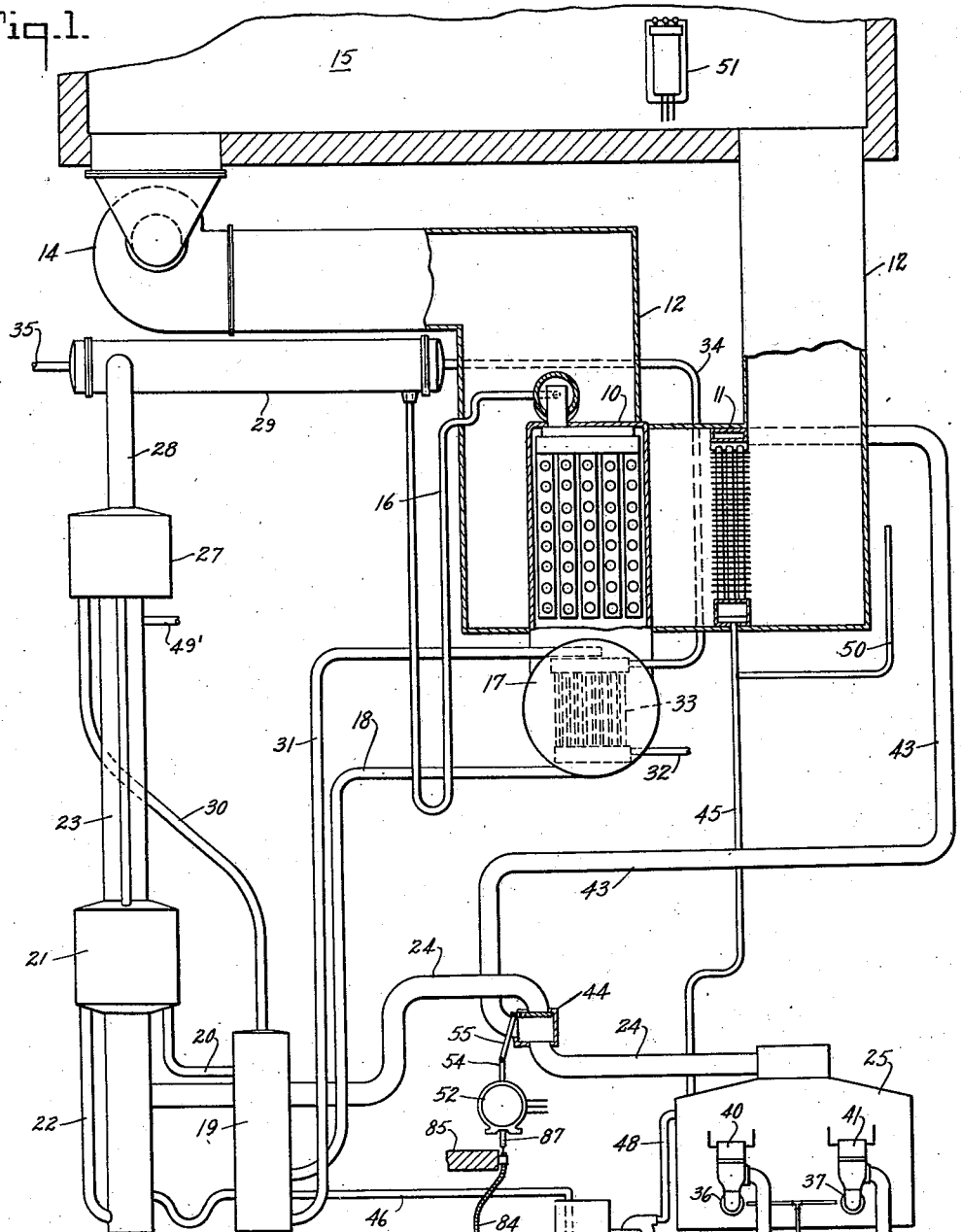
Figure 4:
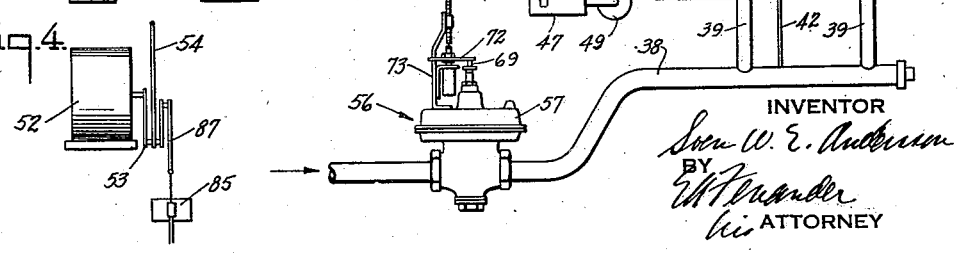
Figure 2:
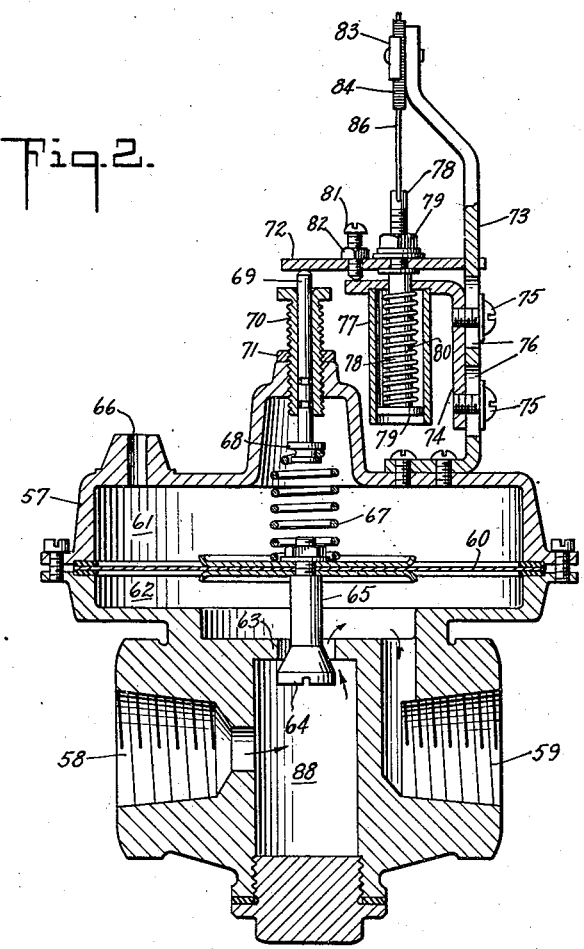
Figure 3:
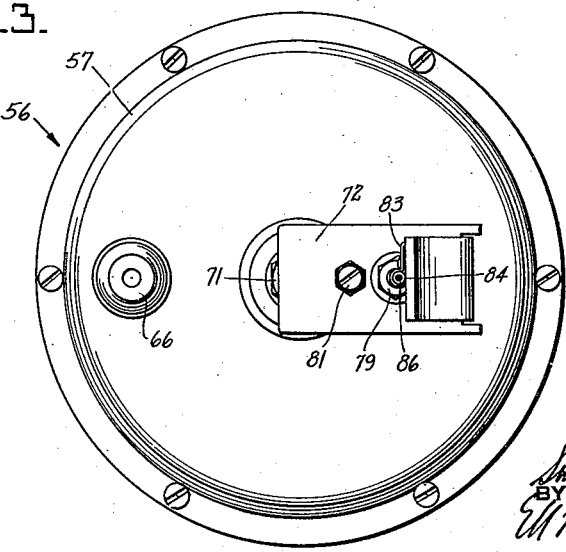

The above and other objects and advantages of the invention will be more fully understood from the following description taken in conjunction with the accompanying drawings forming a part of this specification, and of which Fig. 1 illustrates an air conditioning system provided with a gas pressure regulator embodying the invention; Fig. 2 is an enlarged vertical sectional view illustrating more clearly the regulator shown in Fig. 1; Fig. 3 is a horizontal top plan view of the regulator shown in Figs. 1 and 2; and Fig. 4 is an enlarged side view of the control motor shown in Fig. 1.

Referring to Fig. 1, the invention is shown in connection with an air conditioning system including a cooling element 10 and a heating element 11. The cooling and heating elements 10 and 11 are disposed in a duct 12 into which air is discharged from a blower 14 connected to withdraw air from an enclosure 15. After being either heated or cooled the treated air is returned through duct 12 to the enclosure 15.

The cooling element 10 forms part of a refrigerating unit of a two-pressure absorption type like that described in application Serial No. 239,762 of A. R. Thomas and P. P. Anderson, Jr., filed November 10, 1938, now Patent No. 2,282,503 granted May 12, 1942. In a system of this type liquid refrigerant, such as water, for example, is introduced through a conduit 16 into the upper part of cooling element 10. The liquid refrigerant evaporates in cooling element 10 with consequent absorption of heat to produce a refrigerating or cooling effect to cool air flowing through duct 12, as explained above.

The refrigerant vapor formed in cooling element 10 flows therefrom to an absorber 17 in which the vapor is absorbed into a liquid absorbent, such as lithium chloride solution, for example. The absorption liquid enriched in refrigerant is conducted from absorber 17 through a conduit 18, a first passage in a liquid heat exchanger 19, a conduit 20, vessel 21 and conduit 22 into the lower part of a generator 23. Within generator 23 are disposed a plurality of riser tubes enveloped by a chamber formed by the outer shell to which steam is supplied through a conduit 24 from a steam boiler 25.

The heating of the riser tubes in generator 23 by the steam causes refrigerant vapor to be expelled from the absorbent, such expelled vapor being effective to raise liquid absorbent by gas or vapor-lift action. The expelled vapor passes from the upper ends of the riser tubes into a vapor separator 27, and thence flows through a conduit 28 to a condenser 29 in which the vapor is liquefied. The liquid refrigerant formed in condenser 29 flows through conduit 16 to the upper part of cooling element 10, as explained above, to complete the refrigerating cycle.

The raised absorption liquid from which refrigerant vapor has been expelled is conducted from the upper part of generator 23 through a conduit 30, a second passage in liquid heat exchanger 19 and conduit 31 to the upper part of absorber 17. The absorber 17 and condenser 29 constitute heat rejecting parts of the refrigeration unit and are cooled by a suitable cooling medium, such as water, for example, which is conducted from a suitable source of supply through a conduit 32 to a bank of tubes 33 within the absorber so that heat of absorption, which results from absorption of refrigeration vapor by liquid absorbent, is given up to the cooling water. The cooling water is conducted from absorber 17 through a conduit 34 to condenser 29 in which heat of condensation is given up to the cooling water, the water then passing from the condenser 29 through a conduit 35.

In order to simplify the drawings, the parts of the refrigeration unit have not been shown in detail, such an illustration of the parts not being necessary for an understanding of this invention. The disclosure in the aforementioned Thomas and Anderson application may be considered as being incorporated in this application, and, if desired, reference may be made thereto for a detailed description of the refrigeration unit.

The steam boiler 25 is arranged to be heated by two burners 36 and 37 with the flames produced thereby adapted to pass into flues which are in communication with heating tubes disposed within the boiler. A combustible gas is delivered to the burners through conduits 38 and 39 from a suitable source of supply with the flow of gas being controlled by electro-magnetically operated solenoid valves 40 and 41. Suitable tubing 42 is connected to conduit 38 to provide pilot flames for igniting the gas from the burners when the valves 40 and 41 are opened after a shut-down period.

In addition, to supplying steam from boiler 25 to generator 23 of the refrigeration unit, steam is also supplied to heating element 11 through a part of conduit 24 and a conduit 43. A steam valve 44 is provided at the juncture of conduits 24 and 43 to cause steam to flow either to the generator 23 or heating element 11.

The condensate formed in heating element 11 flows by gravity through a conduit 45 directly into the upper part of boiler 25. The condensate formed in generator 23 flows by gravity through a conduit 46 to a condensate collection vessel 47. From vessel 47 the condensate is returned to the upper part of boiler 25 through a conduit 48 in which is connected a pump 49 operated in any suitable manner, as by electric motor, for example. Although not illustrated, the boiler 25 is connected to a suitable source of water supply through which additional make-up water may be added from time to time, responsive to a liquid level control device of any well-known type, to keep the water at a desired level in the boiler.

The steam boiler 25 operates substantially at atmospheric pressure, there being a steam vent 49' at the upper part of the steam chamber in generator 23 and a steam vent 50 for the heating element 11. The condensate formed in heating element 11 trickles down along the inside walls of the conduit 45 and does not completely block off or seal the heating element 11 from the vent 50, wherefore it will be clear that steam can flow from the heating element through the vent 50 when all of the steam supplied to the heating element does not condense therein.

In the above-described air conditioning system the blower 14 may be operated alone or concurrently with the cooling element 10 or heating element 11 so that simply circulation of air alone or cooling or heating of air in enclosure 15 can be effected. The burners 36 and 37 may be controlled in any suitable manner responsive to the temperature of the air adapted to be conditioned by the system. For example, a suitable control like that described in my co-pending application Serial No. 406,777, filed August 14, 1941, may be employed with a control device 51 located in enclosure 15 to control the operation of the blower and solenoid operated valves 40 and 41. A control device of the character described in my aforementioned application also embodies mechanism whereby the steam valve 44 is operated to permit all of the steam from boiler 25 to be supplied to generator 23 when cooling is desired and to permit all of the steam to be supplied to heating element 11 when heating is desired. Such mechanism includes a two-position electrically operated control motor 52 which, when caused to move from either one of its two positions to the other position, becomes de-energized when the other position is reached.

As diagrammatically illustrated in Figs. 1 and 4, a U-shaped crank 53 provided on control motor 52 is operatively connected by a link 54 to an angularly movable lever 55 which is capable of actuating steam valve 44. In the illustrated position of lever 55 the flow of steam to generator 23 is shut off with all of the steam arranged to flow through conduit 43 to heating element 11. When the two-position control motor 52 is caused to operate to move crank 53 in a clockwise direction to its other position approximately 180 degrees from the position shown in Fig. 4, steam valve 44 is actuated to permit all of the steam from boiler 25 to pass through conduit 24 to generator 23 and to shut off flow of steam to heating element 11. The operation of control motor 52 to cause the movement of U-shaped crank 53 just described is effected by completing an electric circuit across two of the terminals of control motor 52 when cooling of air is desired. By completing another electric circuit across two other terminals of control motor 52 when heating is desired, the latter is caused to operate to move crank 53 in a clockwise direction from its upper position to the lower position illustrated in Fig. 4. When this occurs valve 44 is moved to its illustrated position whereby the flow of steam to generator 23 is shut off and all of the steam is supplied through conduit 43 to heating element 11. Two-position motors 52 of the kind just described are well known and in selecting a motor of this type to operate steam valve 44 it should be understood that any such motor capable of moving the steam valve between its two operating positions may be employed.

In a combined heating and cooling system of the type described above, there is usually the requirement of a higher heat input into the boiler 25 during a heating period than during a cooling period. During both the heating and cooling periods it is essential that the pressure of the gas supplied to burners 36 and 37 be maintained at a substantially constant delivery pressure. To this end a gas pressure regulator 56 is provided in gas conduit 38 and provision is made for utilizing the same regulator during both the heating and cooling periods.

Referring more particularly to Fig. 2 the gas pressure regulator includes a casing 57 having inlet and outlet openings 58 and 59 connected in conduit 38. A flexible diaphragm 60 is secured at its peripheral edge between the top and bottom parts of casing 57 to form chambers 61 and 62, and in the bottom chamber 62 a partition 63 is provided having an opening to form a main passage for flow of gas from inlet 58 to outlet 59. The region of partition 63 about the opening therein serves as a seat for a valve 64 having a stem 65 secured to the diaphragm 60.

The top chamber 61 is vented at 66 to atmosphere and a regulating or load spring 67 is disposed therein having the larger lower end thereof bearing against the top side of diaphragm 60 and the smaller upper end thereof formed to be held in a groove provided in a head or enlarged portion 68 of a pin 69. The top part of casing 57 is formed with a dome having an opening which is threaded to receive a hollow bushing 70 in which the pin 69 is axially movable. A lock nut 71 is provided for bushing 70 to rigidly hold the latter in any position to which it is adjusted.

The outer end of a horizontally disposed lever arm 72 is arranged so that it may contact and bear against the upper end of pin 69. The inner end of arm 72 is recessed to form a channel adapted to receive the upper vertical part of a bracket 73 which is fastened to the top part of casing 57. An angle member 74 is secured by screws 75 to bracket 73, the screws being vertically movable in slots 76 so that the horizontal arm of angle member 74 is vertically adjustable. To the angle member 74 is secured a hollow cylinder 77 arranged to receive a pin 78 having an enlarged head 79 at its lower end which fits snugly within the cylinder 77 and is freely movable therein. The pin 78 passes through an opening in the horizontal arm of angle member 74 with a reduced threaded portion thereof passing through a smaller opening in lever arm 72. A suitable lock nut 79 is provided at the upper threaded portion of pin 78 to secure the pin to lever arm 72.

A coil spring 80 maintained under compression is provided about pin 78 with the upper end bearing against the bottom side of the horizontal arm of angle member 74 and the lower end bearing against the enlarged head 79. With this arrangement the spring 80 acts to pull pin 78 and lever arm 72 downwardly. A screw 81 having a lock nut 82 is provided on lever arm 72 with such screw arranged to contact the outer end of angle member 74. Thus, while spring 80 acts to move lever arm downwardly, the screw 81 serves as a stop to limit downward movement of the lever arm.

The upper end of bracket 73 is provided with a clamp 83 which holds in position one end of a hollow flexible cable 84, the other end of which is fastened or held in position in any suitable manner in the vicinity of control motor 52. As shown in Fig. 1, the upper end of hollow flexible cable 84 is fastened at 85 to a suitable support. A wire 86 passes through the hollow flexible cable 84 with the lower end thereof secured to the upper end of pin 78 and the upper end thereof secured to the lower end of a link 87 pivoted at its upper end to the outer arm of U-shaped crank 53 at a region below the axis about which crank rotates, as shown most clearly in Fig. 4.

During heating periods there is usually the requirement of a higher heat input to boiler 25 than during the cooling periods, as pointed out above. Under such conditions the lever arm 72 is in the position shown in Fig. 2 with the outer end thereof acting against the pin 69. The pressure at which gas is supplied to burners 36 and 37 is dependent upon the extent to which load spring 67 is compressed by pin 69. This can be adjusted and determined by the vertical position of angle member 74 on bracket 73 and the additional adjustment of screw 81 on lever arm 72. When these adjustments are made, gas is supplied to burners 36 and 37 at a predetermined delivery pressure, the gas pressure regulator 56 acting to maintain such delivery pressure substantially constant.

During the heating periods the pressure exerted in chamber 62 on the underside of diaphragm 60 is balanced by the atmospheric pressure on the upper side thereof and the pressure exerted by the load spring 67. In the event the pressure in chamber 62 tends to decrease the diaphragm falls to open valve 64 so that a greater quantity of gas can flow through the opening in partition 63. Such fall of the diaphragm occurs, for example, when the gas line pressure decreases at the inlet 58. The valve 64 assumes a new position for the decreased line pressure when the forces exerted on opposite sides of diaphragm 60 are balanced. In this new position of valve 64 the gas pressure on the under side of diaphragm 60 is the same as it was before a decrease in gas line pressure took place, so that gas is delivered to burners 36 and 37 at the same constant delivery pressure which is dependent, as pointed out above, on the tension of load spring 67.

Similarly, in the event the pressure in chamber 62 tends to increase, the diaphragm rises to close valve 64 so that a smaller quantity of gas can flow through the opening in partition 63. Such rise of the diaphragm results, for example, with an increase in the gas pressure at inlet 58. The valve 64 assumes a new position for the increased line pressure when the forces exerted on opposite sides of diaphragm 60 are balanced. With this new position of valve 64, the gas pressure on the under side of diaphragm 60 is the same as it was before an increase in gas line pressure took place, so that gas is supplied to burners 36 and 37 at the same predetermined gas delivery pressure.

When the two-position control motor 52 is caused to move from the position shown in Figs. 1 and 4 to its other position that it assumes during a cooling period, the crank 53 is rotated approximately 180 degrees so that the crank extends vertically upward. When this occurs the link 87 is raised or lifted and the wire 86 is pulled upward, such upward movement of the wire being effected against the action of coil spring 80. In the upper position of crank 53, valve 44 is in such a position that all of the steam is supplied through conduit 24 to generator 23 of the refrigerator unit. Also, the upward pull of wire 86 raises lever arm 72 and pin 78 as a unit, the lever arm with such upward movement thereof being guided by the vertical or upright part of bracket 73. With upward movement of lever arm 72 the pin 69 follows lever arm, due to the action of load spring 67, until the enlarged head 68 of pin 69 engages the lower end of bushing 70.

The lever arm 72 is raised such a distance by the upward pull of wire 86 that the outer end thereof is free and clear of pin 69 after the latter reaches its upper limit of movement. The predetermined gas delivery pressure when lever arm 72 is free and clear of pin 69 can be determined by adjusting the vertical position of bushing 70 in the dome or top part of casing 57. With the head 68 of pin 69 engaging the bushing 70 the load spring 67 is under less compression than during the heating periods at which time the load spring is more compressed and the head 68 of pin 69 is below the lower end of the bushing 70, as illustrated in Fig. 2. Thus, the pressure of load spring 67 on diaphragm 60 during the cooling periods is less than during the heating periods and gas is delivered at a lower constant pressure to the burners 36 and 37 with the regulator 56 operating as described above, so that heat is supplied at a lower rate to the boiler 25 by the burners.

When the control motor 52 is again caused to move to the position shown in Figs. 1 and 4 at a time when heating is desired, the movement of crank 53 to its down position releases the pull effected by wire 86, whereby the coil spring 80 becomes effective to move lever arm 72 downward to act against the upper end of pin 69. This downward movement of lever arm 72 is determined, as pointed out above, by the position of angle member 74 on bracket 73 and the adjustment of screw 81.

In view of the foregoing, it will now be understood that gas pressure regulator 56 is adjustable to supply gas at different predetermined delivery pressures during the heating and cooling periods, and that automatic changing of the gas supply from one delivery pressure to another is automatically effected when the control motor 52 is operated to initiate either a heating or cooling period, the control motor also being effective to operate steam valve 44 to cause steam to be supplied either to generator 23 of the refrigeration unit or heating element 11.

Although a single embodiment of the invention has been shown and described, it will be apparent to those skilled in the art that various changes and modifications may be made without departing from the spirit and scope of the invention, as pointed out in the following claims.

What is claimed is:

1. In combination with heating means and a heat operated refrigerating means, a source of heat, structure regulating the source of heat and operable to supply heat to said means at different predetermined constant rates from said heat source, a selective control operable to cause heat to be supplied to said plurality of means one at a time and to be shut off from the other of the means, and mechanism responsive to the operation of said control to operate said structure whereby to cause heat to be supplied to each of the plurality of means at a predetermined different rate from the rate at the other means.

2. In combination with heating means and a heat operated refrigerating means, a source of heat, one of said means to be heated by heat supplied at a predetermined rate from said source of heat and the other of said means to be heated by heat supplied at a different predetermined rate from said source of heat, means for regulating the source of heat to supply heat at the plurality of different predetermined rates, a selective control operable to cause heat to be supplied to said plurality of means one at a time and to be shut off from the other of the means, and mechanism responsive to operation of said control to operate said regulating means whereby to cause heat to be supplied to each of the plurality of means at a different predetermined rate from the rate of heating at the other means.

3. In combination with heating means and a heat operated refrigerating means, a heater, means for supplying gas fuel to said heater, a gas pressure regulator for controlling the gas supplied to said heater to produce heat at a plurality of different predetermined rates, a selective control operable to cause heat to be supplied to said plurality of means one at a time and to be shut off from the remainder of the means, and mechanism responsive to the operation of said control means to operate said gas pressure regulator whereby to cause heat to be supplied to each of the plurality of means at a predetermined rate different from the rate of supply to the other means.

4. In combination with a plurality of devices adapted to be heated by steam, a steam boiler, conduit means for conducting steam from said boiler to said devices, valve means in said conduit means for controlling flow of steam therethrough, a control for operating said valve means, a gas heater for said boiler, and a gas line for supplying gas to said heater, a gas pressure regulator connected in said line, structure associated with said regulator to render the latter operable to supply gas to said heater at a plurality of predetermined gas delivery pressures, and mechanism arranged to be actuated by said control for operating said structure for selectively supplying gas to said heater at one of said predetermined gas delivery pressures when said control actuates said valve means to supply steam to one of said devices, and at another of said predetermined gas delivery pressures when said control actuates said valve means to supply steam to another of said devices.

5. In combination with an air conditioning system including refrigeration apparatus adapted to be operated by heat and a heater, a source of heat, and a control whereby said refrigeration apparatus or heater may be heated by heat derived from said heat source, heat regulating means associated with said source of heat, structure associated with said heat regulating means whereby the heat output of said heat source is in a first range when cooling by said refrigeration apparatus is desired and in another range when heating by said heater is desired, and mechanism responsive to operation of said control for operating said structure whereby the heat output of said heat source is in said first range when said control is actuated to cause cooling by said refrigeration apparatus and in said other range when said control is actuated to cause heating by said heater.

6. In combination with refrigeration apparatus having a heat receiving part and a heater, a boiler, conduit means for conducting steam from said boiler to said heat receiving part and said heater, valve means in said conduit means for controlling flow of steam therethrough, a control device for operating said valve means, a heater for heating said boiler, and a conduit for conducting gas to said heater, a gas pressure regulator in said last-mentioned conduit having an inlet and outlet for gas, a diaphragm operated valve for controlling flow of gas from the inlet to the outlet, loading means for said diaphragm, structure associated with said loading means for supplying gas at the outlet at a first predetermined gas delivery pressure when heating by said heater is desired and at another predetermined gas delivery pressure when cooling by said refrigeration apparatus is desired, and mechanism operatively associating said structure and said control device whereby said structure is effective to cause gas to be supplied at the outlet at said first predetermined gas delivery pressure when said control device actuates said valve means to supply steam to said heater, and said structure is effective to cause gas to be supplied at the outlet at said other predetermined gas delivery pressure when said control device actuates said valve means to supply steam to said heat receiving part.

7. A gas pressure regulator having an inlet and outlet for gas, a diaphragm operated valve for controlling the flow of gas from the inlet to the outlet, loading means acting on said diaphragm in opposition to the pressure of gas at the outlet side of said valve, an arm engaging said loading means, a spring for operating said arm to adjust said loading means to cause gas to be supplied at the outlet at a predetermined constant pressure, and means operable in opposition to said spring for raising said arm away from said loading means, said loading means including means to limit the change in the effect of the loading means on the diaphragm when said arm is raised away from said loading means whereby said gas will be supplied at a second predetermined constant pressure.

8. A gas pressure regulator having an inlet and outlet for gas, a diaphragm operated valve for controlling the flow of gas from the inlet to the outlet, a spring arranged to act on said diaphragm in opposition to pressure of gas at the outlet side of said valve, an arm operable on said spring, a second spring for actuating said arm to adjust the tension of the first spring to cause the valve to supply gas at one predetermined constant pressure at the outlet, means operable in opposition to said second spring for moving said arm away from said first spring, and means to limit the change in the effect of the first spring on the diaphragm when said arm is moved away from said first spring whereby the valve will operate to supply gas at a second predetermined constant pressure at the outlet.

SVEN W. E. ANDERSSON.